US010404611B2

(12) United States Patent
Gao

(10) Patent No.: US 10,404,611 B2
(45) Date of Patent: Sep. 3, 2019

(54) DISCOVERING PATH MAXIMUM TRANSMISSION UNIT

(71) Applicant: HEWLETT PACKARD ENTERPRISE DEVELOPMENT LP, Houston, TX (US)

(72) Inventor: Yunlei Gao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 101 days.

(21) Appl. No.: 15/522,867

(22) PCT Filed: Oct. 28, 2015

(86) PCT No.: PCT/CN2015/093085
§ 371 (c)(1),
(2) Date: Apr. 28, 2017

(87) PCT Pub. No.: WO2016/066101
PCT Pub. Date: May 6, 2016

(65) Prior Publication Data

US 2017/0331755 A1 Nov. 16, 2017

(30) Foreign Application Priority Data

Oct. 29, 2014 (CN) .......................... 2014 1 0597850

(51) Int. Cl.
*H04L 12/805* (2013.01)
*H04L 12/413* (2006.01)
(Continued)

(52) U.S. Cl.
CPC .......... *H04L 47/365* (2013.01); *H04L 12/413* (2013.01); *H04L 12/4135* (2013.01);
(Continued)

(58) Field of Classification Search
CPC ..... H04L 47/365; H04L 45/26; H04L 12/413; H04L 12/4135; H04L 69/166
See application file for complete search history.

(56) References Cited

U.S. PATENT DOCUMENTS

| | | | |
|---|---|---|---|
| 2004/0218550 | A1 | 11/2004 | Kim |
| 2007/0115963 | A1 | 5/2007 | Vadlakonda |
| 2011/0090851 | A1 | 4/2011 | Khalil et al. |

FOREIGN PATENT DOCUMENTS

| | | |
|---|---|---|
| CN | 1716944 | 1/2006 |
| CN | 101931588 | 12/2010 |

(Continued)

OTHER PUBLICATIONS

Heffner et al., “Fragmentation Considered Very Harmful”, IEFT 66, Jul. 2006, 13 pages.

(Continued)

*Primary Examiner* — Asad M Nawaz
*Assistant Examiner* — Saad A. Waqas
(74) *Attorney, Agent, or Firm* — Hewlett Packard Enterprise Patent Department

(57) ABSTRACT

A method for discovering a PMTU, applicable to a destination node of a path, includes: receiving fragment packets from a source node of the path; determining a detecting range based on a maximum length and a minimum fragment unit of the fragment packets; selecting a detecting value within the detecting range in accordance with a predetermined strategy, requesting the source node to respond with a response packet of a length equal to the detecting value, and determining a PMTU of the path based on whether the response packet from the source node is fragmented.

13 Claims, 5 Drawing Sheets

(51) Int. Cl.
*H04L 12/721* (2013.01)
*H04L 29/06* (2006.01)
*H04W 48/16* (2009.01)
*H04W 80/02* (2009.01)
*H04W 80/04* (2009.01)

(52) U.S. Cl.
CPC ............ *H04L 45/26* (2013.01); *H04L 69/166* (2013.01); *H04W 48/16* (2013.01); *H04W 80/02* (2013.01); *H04W 80/04* (2013.01)

(56) References Cited

FOREIGN PATENT DOCUMENTS

CN 102546359 B * 12/2014 ............. H04L 47/10
EP 1381200 1/2004

OTHER PUBLICATIONS

International Searching Authority, "Notification Of Transmittal Of The International Search Report And The Written Opinion", PCT Patent Application No. PCT/CN2015/090385 dated Feb. 2, 2016 11 pages.

M. Mathis et al., "Packetization Layer Path MTU Discovery", Network Working Group, Request for Comments: 4821, Mar. 31, 2007, pp. 13-26 and Figure 1.

Mathis et al., "Fragmentation Considered Very Harmful", Network Working Group, Internet-Draft, Jul. 10, 2004, 8 pages.

* cited by examiner

DISCOVERING PATH MAXIMUM TRANSMISSION UNIT

BACKGROUND

The maximum data packet allowed to pass an interface of a network device is dependent upon hardware configuration, transmission protocol and other factors of the interface. If the length of a data packet exceeds the maximum data packet length allowed to pass an interface of a network device, the data packet will be fragmented into several fragments, which are encapsulated respectively into several fragment packets with lengths no more than the maximum data packet length and transmitted to a destination node for recombination; and this process can be referred to as fragmentation, and the packet obtained from the fragmentation can be referred to as a fragment packet.

The maximum link layer payload allowed to pass a network device without any fragmentation can be referred to as a Maximum Transmission Unit (MTU). The maximum link layer payload which can be transmitted from a source host to a destination host without any fragmentation can be referred to as a Path Maximum Transmission Unit (PMTU). And in general, the PMTU of a data packet transmission path is equal to the minimum MTU among all of device interfaces on the path.

DETAILED DESCRIPTION OF THE EMBODIMENTS

Figure 1:
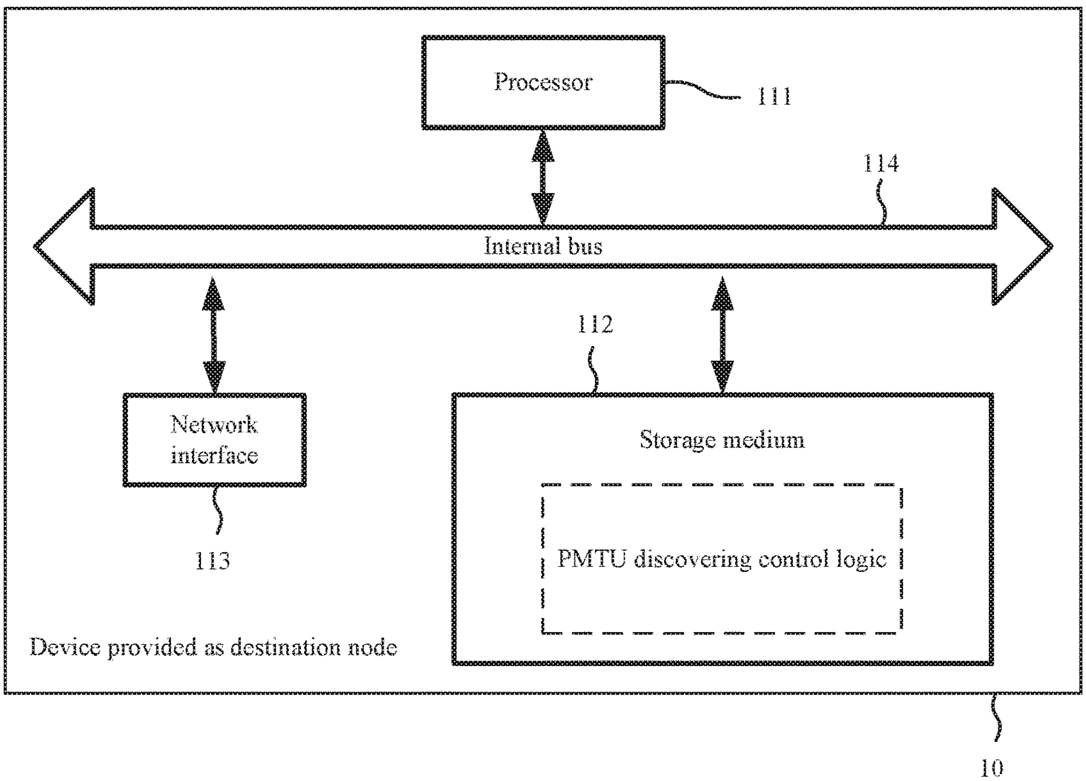
FIG. 1 is a schematic diagram of the hardware architecture of a device in which a destination node is provided according to an example of the disclosure.

Generally, the length of a data packet shall be as large as possible in order to transmit data more efficiently. However if the data packet is fragmented into several fragment packets because its length exceeds the PMTU for its transmission path, a new header may be encapsulated into each fragment packet, thus the efficiency of transmission may be lowered, and an error in recombination may further occur. Accordingly, for the performance of a network, it may be important to rapidly discover a PMTU with traffics as little as possible.

For a data packet, the fragmentation and corresponding recombination both are performed at the network layer. That is, for the data to be transmitted at the network layer, an MTU of the transmission interface shall be considered, and if the length of a network layer datagram which is obtained by performing a layer-3 encapsulation to the data exceeds the MTU, the datagram will be fragmented at the network layer and a layer-3 header will be regenerated for each fragment datagram.

Taking the IP protocol at the network layer as an example, an IP header may include information for fragmentation and recombination, and the structure of the IP header may be as depicted in Table 1:

TABLE 1

| Identification | R | DF | MF | Fragment Offset |
|---|---|---|---|---|

In Table 1, the Identification field of two bytes carries the ID of the datagram. The source node may assign an ID to each IP datagram for identifying the IP datagram uniquely, and thus a destination node may determine whether the received fragment IP datagrams belong to the same original datagram according to the ID carried in the received fragment IP datagram. The R field, DF (i.e., Don't Fragment) field and MF (More Fragment) field are all of one bit, and wherein: the R bit is reversed for later use; the DF bit of 0 indicates that the present IP datagram can be fragmented, and the DF bit of 1 indicates that the present IP datagram cannot be fragmented; and the MF bit of 0 indicates that the present IP datagram is the last fragment datagram of an original datagram or is not a fragment datagram, and the MF bit of 1 indicates that the present IP datagram is a fragment datagram but not the last fragment datagram of an original datagram. The Fragment Offset field of 13 bits indicates an offset of the present IP datagram from the beginning of the original datagram, wherein the number of offset bytes may be a value of the Fragment Offset field multiplied by 8. That is, at the network layer, the IP datagram is fragmented in a unit of 8 bytes, because the minimum fragment unit complied with the IP protocol is 8 bytes. In order to decrease the number of fragments, preferably, each fragment datagram is generated as large as possible but not exceeds the MTU.

Each fragment layer-3 datagram is a link layer payload and will be layer-2 encapsulated to generate a fragment packet (e.g., a layer-2 Ethernet frame). Then, each fragment packet is transmitted to the destination node, and the recombination of fragment packets on the destination node is also performed at the network layer. Taking a layer-3 IP datagram as an example again, according to the above fields in the IP header, the destination node can determine whether a recombination is to be performed and how to perform the recombination. For example, an IP datagram with MF bit of 0 and Fragment Offset field of 0 is not a fragment datagram; an IP datagram with MF bit of 1 can be sorted according to its Fragment Offset field; and an IP datagram with MF bit of 0 and Fragment Offset field of a value other than 0 is the last fragment datagram. In this way, the received fragment datagrams can be recombined into an integral original datagram on the destination node.

The DF bit in an IP header may be used to discover a PMTU. A method for determining a PMTU is described in the Request For Comments (RFC) 1191, wherein: a source node of a transmission path sends a probe packet in which the DF bit is set as 1 (that is, the packet cannot be fragmented), and if the length of the probe packet exceeds the maximum packet length allowed to pass an interface of some node on the path, the probe packet will be discarded since it cannot be fragmented and the node will respond with a message of "Transmission failure due to cannot be fragmented" to the source node. If the message of "Transmission failure due to cannot be fragmented" is received, the source node will resend a probe packet with a decreased length; otherwise, the source node will resend a probe packet with an increased length. The source node can determine the PMTU by a number of probe packets with different lengths.

This above method for determining a PMTU usually takes a relative long time to obtain the accurate PMTU, and the process of repeated iteration and constantly probing will consume resources of the network and degrade the performance of the network. Moreover, the PMTU is determined on the source node in this method, but the PMTU is preferably to be determined on the destination node in some application scenarios. For example, in the field of network management, a large amount of data is transmitted along a path from a managed device to a network management server, and it may be more important for the network management server to get the PMTU of a transmission path from the managed device to the network management server.

In an example of this disclosure, a PMTU discovering control logic may be executed on a destination node in order to determine a PMTU of a path from a source node to the destination node with a shorter time as well as less resources, wherein: the source node and the destination node can be any two physical or logic nodes in a network which can communicate with each other, such as a host, a network device, a virtual machine, a virtual switch, etc.

Figure 2:
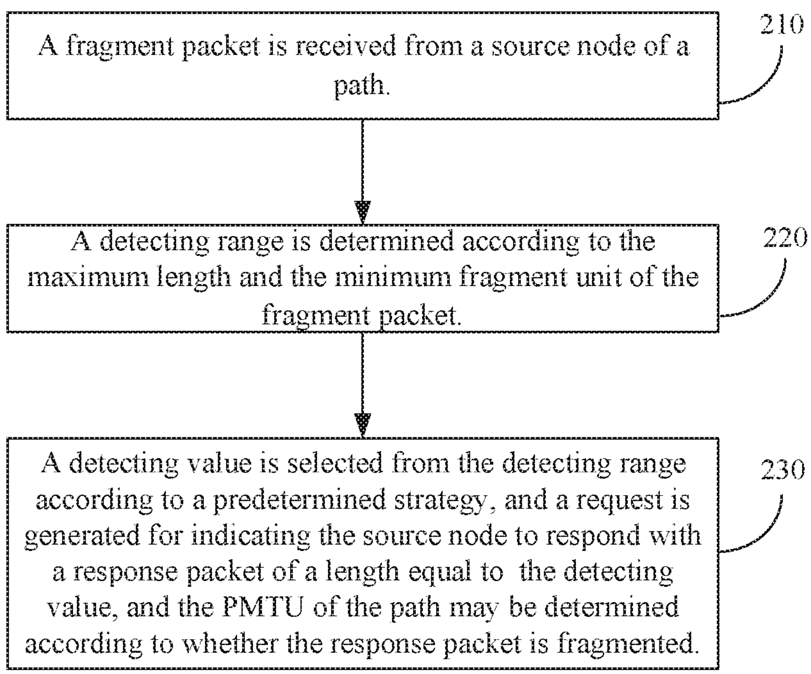
FIG. 2 is a flow chart of a method for discovering a PMTU according to an example of the disclosure.

Referring to FIG. 1, a device 10 in which a destination node is provided may include a processor 111, a storage medium 112, and a network interface 113, all of which are connected with each other by an internal bus 114. In this example, the processor 111 executes the PMTU discovering control logic in the storage medium 112 in an operational flow as illustrated in FIG. 2.

At block 210, a fragment packet is received from a source node of a path.

In an example, the fragment packet from the source node of the path can be a fragment packet generated by the source node. And in another example, the fragment packet from the source node may be a fragment packet generated by a node from a non-fragment packet, wherein the non-fragment packet is sent by the source node and its length exceeds the maximum packet length allowed to pass the node or a neighboring node.

In an example, in order to discover a PMTU, a destination node will request a source node to respond with a response packet of a specified length, wherein the specified length shall be large enough to cause the response packet being fragmented. The length limit of a packet allowed to be transmitted in different layer-2 networks may be different, but each layer-2 network has its upper limit. Generally the response packet of the specified length will be fragmented as long as the specified length exceeds the upper limit of the layer-2 network to which the path belongs. For the sake of a margin, the specified length can be somewhat more than the upper limit. For example, if the maximum length of a layer-2 payload according to the Ethernet packet (or frame) protocol is 1500 bytes (that is, the maximum length of an Ethernet packet is 1514 bytes), then the specified length may be 1800 bytes.

In this example, the source node and the destination node both support a function for specifying the length of a response packet. According to an example, the communication protocol between the destination node and the source node supports this function, and the destination node can request the source node to respond with a packet of a preset length by a command complied with the communication protocol. According to other examples, this function can be realized by extending existing request and response packets, or by customizing a request and response procedure to specify the length of a response packet. The source node responds with a packet of the specified length upon receiving the request from the destination node, so that the destination node can receive fragment packets responded by the source node.

At block 220, a detecting range is determined according to the maximum length and the minimum fragment unit of the fragment packet.

As described above, the fragmentation for a packet at the network layer is based on the minimum fragment unit, and fragment packets generated by the fragmentation is preferable as large as possible without exceeding the MTU. In other words, among the fragment packets received by the destination node which are generated from the same original packet, the length of the longest fragment packet is dependent upon the PMTU and the minimum fragment unit.

In this example, the length of a packet refers to the number of bytes of a whole layer-2 frame. Wherein, the layer-2 frame may include a layer-2 header and a layer-2 payload (i.e., a layer-3 datagram), and may further include a layer-2 tail if a tail is encapsulated. The PMTU represents the length of the layer-2 payload (i.e., the length of the layer-3 datagram), and the length of the layer-2 payload is equal to the length of the packet minus the total length of the layer-2 encapsulation, i.e., the sum of the lengths of the layer-2 header and the layer-2 tail. Assuming that FraMaxLen represents the length of the longest fragment packet received by the destination node, MinFragUnit represents the length of the minimum fragment unit, and PMTUFrameLen represents the length of a packet including a layer-2 payload of the length PMTU (i.e., a possible maximum fragment packet length), the following Equation 1 will hold true:

$$\text{FraMaxLen} \leq \text{PMTUFrameLen} \leq (\text{FraMaxLen}+\text{MinFragUnit}-1) \quad \text{Equation 1}$$

If PMTUFrameLen is smaller than FraMaxLen, the longest fragment packet cannot reach the destination node. On the other hand, if PMTUFrameLen is bigger than (FraMaxLen+MinFragUnit−1), the fragment packet can also reach the destination node even the length of which is increased by one minimum fragment unit, and it means that the fragment packets are not generated as large as possible. So, Equation 1 holds true.

The length of a packet including a layer-2 payload of the length PMTU lies in the range with FraMaxLen being the lower limit and (FraMaxLen+MinFragUnit−1) being the upper limit. The range is determined as the detecting range for discovering the PMTU, and it is obvious that the span of the detecting range is dependent on the minimum fragment unit.

At block 230, a detecting value is selected from the detecting range according to a predetermined strategy, and a request is generated for instructing the source node to respond with a response packet of a length equal to the detecting value, and the PMTU of the path may be determined according to whether the response packet is fragmented.

The destination node selects detecting values from the detecting range at least once according to the predetermined strategy, and requests the source node to respond with a response packet of a length equal to each detecting value. If the length of the layer-2 payload in the response packet exceeds the PMTU, the response packet received by the destination node is a fragment packet; otherwise, the response packet received by the destination node will not be fragment packet. The length of the layer-2 payload in the longest response packet which is not fragmented (hereinafter, the longest response packet which is not fragmented will also be referred as the longest non-fragmented response packet) may be the PMTU. The destination node can determine the length of the longest non-fragmented response packet (hereinafter, the length of the longest non-fragmented response packet will also be referred as the maximum non-fragmented response packet length) by selecting different detecting values from the detecting range according to the predetermined strategy.

In an example, the destination node can select detecting values in the detecting range sequentially, and request the source node to respond with a response packet of the length equal to each detecting value. For example, if the destination node selects the detecting values sequentially in a descending order, the destination node will stop detecting upon receiving the first response packet which is not fragmented, and the length of this packet (i.e., the detecting value) can be determined as the maximum non-fragmented response packet length. In another example, if the destination node selects the detecting values sequentially in an ascending order, the destination node will stop detecting upon receiving the first response packet which is fragmented, and the length of this packet minus 1 (i.e., the previous detecting value) can be determined as the maximum non-fragmented response packet length. Of course, all values in the detecting range can be selected as detecting values to determine the maximum non-fragmented response packet length.

In another example, the destination node can select a detecting value in the detecting range according to a binary search, and request the source node to respond with a response packet of the length equal to the detecting value. If the response packet is not fragmented, the destination node will select the next detecting value in the larger half of the previous range, and further request the source node to respond with a response packet of the length equal to the detecting value; otherwise, the destination node will select the next detecting value in the smaller half of the previous range, and further request the source node to respond with a response packet of the length equal to the detecting value. This process will be repeated until the longest non-fragmented response packet is located and thus the maximum non-fragmented response packet length can be determined.

The length of the layer-2 payload in the longest non-fragmented response packet is equal to the PMTU, that is, the maximum non-fragmented response packet length minus the total length of the layer-2 encapsulation is the PMTU. Thus the PMTU of the path can be calculated from the maximum non-fragmented response packet length.

In this example, the destination node can determine the detecting range according to the maximum length and the minimum fragment unit of a fragment packet from the source node, and derive the accurate PMTU by communicating a small number of packets whose length are in the detecting range. Thereby, the efficiency of determining the PMTU may be improved, and the traffics consumed for determining the PMTU may be lowered significantly with none substantive influence upon the performance of the network. In this example, the PMTU can be discovered on the destination node, i.e., a PMTU of a path can be discovered in the reverse direction.

In some application scenarios, the physical transmission path from the source node to the destination node may change, for example, if a failure occurs, the transmission path may change according to various dynamic protocols based upon a redundant link and the PMTU may also change. After the PMTU is determined, if a preset condition is satisfied, the destination node can request the source node to respond with one packet of the length corresponding to the PMTU and another packet of the length corresponding to (PMTU+1). If the PMTU does not change, the response packet with the length corresponding to the PMTU will not be fragmented, and the response packet with the length corresponding to (PMTU+1) will be fragmented. If the response packet with the length corresponding to the PMTU is fragmented, or the response packet with the length corresponding to (PMTU+1) is not fragmented, it may indicate that the PMTU have changed and is to be discovered again. The preset condition can be set according to particular application scenario, for example, occurring a failure that may cause the path to change, or at a predetermined period, etc.

In another example of this disclosure, the destination node of the path is a network management server, the source node is a managed device, and the network management server may use a Packet Internet Groper (Ping) command to request the managed device to respond with a packet of some length.

The Ping command is to test network connectivity using an Internet Control Message Protocol (ICMP) packet, and an encapsulation structure of the ICMP packet may be as depicted in Table 2. Wherein, the Ethernet header is 14 bytes, the IP header is 20 bytes, and the ICMP header is 8 bytes. The Ping command can use the option "1" to set the size of ICMP data in the sent ICMP packet.

TABLE 2

| Ethernet header | IP header | ICMP header | ICMP data |
|---|---|---|---|

When a node executing the Ping command sends an ICMP echo request packet to an opposite node, the opposite node will respond with an ICMP echo response packet upon reception of the request packet by setting the ICMP data in the response packet as the request packet defined. When receiving the echo response packet, the node sending the Ping command will determine whether the ICMP echo response packet is fragmented or not and the length of each fragment packet if there is.

Apparently, by defining the size of the ICMP data corresponding to a specified length or a detecting value, the network management server can request the managed device via a Ping command to respond with a packet of the length equal to the specified length or the detecting value. Particularly, the size of the ICMP data may be equal to the specified length or the detecting value minus 42 bytes (including the 14-bytes Ethernet header, the 20-bytes IP header, and the 8-bytes ICMP header). The length of the layer-2 payload in the ICMP echo response packet is equal to the length of the response packet minus 14 bytes (of the Ethernet header).

It shall be noted that a layer-2 frame transmitted over the Ethernet may be further followed by a 4-bytes checksum field for performing a Cyclic Redundancy Check (CRC) check on the layer-2 frame, so as to prevent the layer-2 frame from changing abnormally in transmission. The 4-byte checksum field neither is a component of the layer-2 frame nor accounts for the length of the packet.

Figure 3:
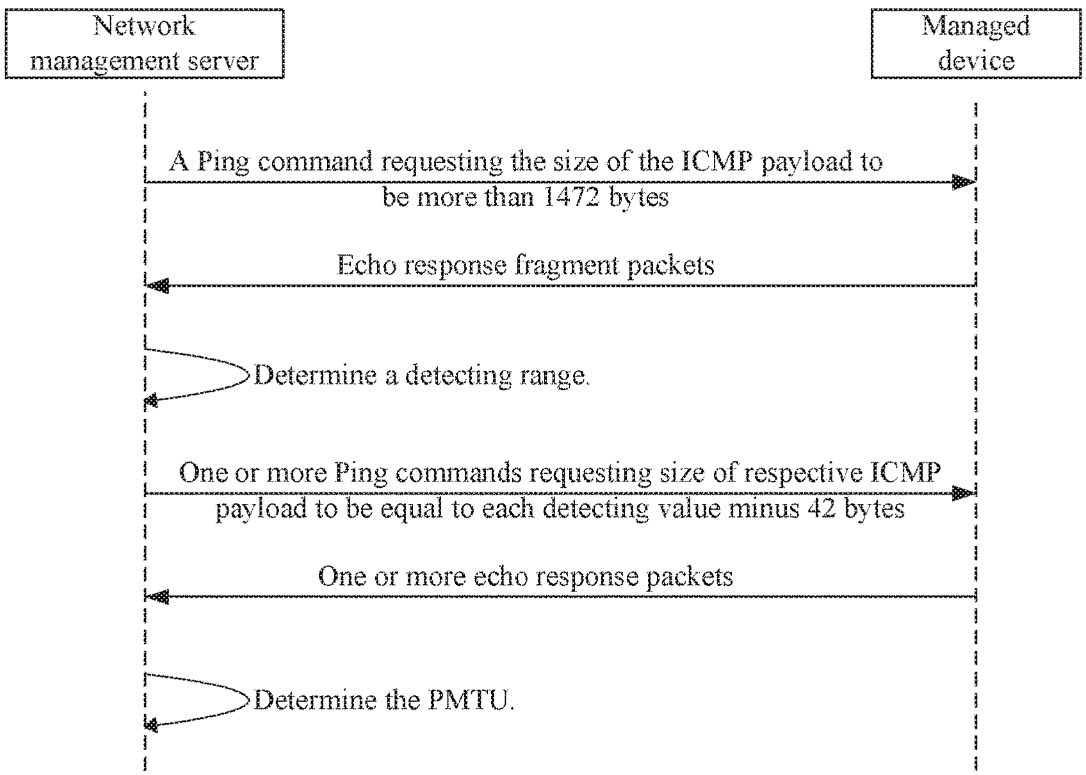
FIG. 3 is an interacting flow chart between a network management server and a managed device for discovering a PMTU according to an example of the disclosure.

According to this example, FIG. 3 illustrates an interacting flow between the network management server and the managed device.

The network management server sends a Ping command to the managed device, wherein the size of the ICMP payload in the ICMP echo request packet may be defined as equal to the specified length minus 42 bytes. As described above, the specified length shall be more than 1514 bytes, so the size of the ICMP payload shall be more than 1472 bytes.

For example, if the specified length is 2042 bytes, the Ping command sent to the managed device may be as follows:

Ping−1 2000 60.0.1.60;

Wherein, 60.0.1.60 is the IP address of the managed device.

The managed device responds with an echo response packet including the ICMP payload of 2000 bytes, the response packet is fragmented at the network layer according to the minimum fragment unit (i.e., 8 bytes) of the IP protocol, and the fragment packets are transmitted respectively to the network management server.

The network management server identifies the longest fragment packet. Assuming that the length of the longest fragment packet is Length, a range of [Length, Length+7] may be determined as the detecting range.

The network management server selects one or more detecting values in the range of [Length, Length+7] according to a predetermined strategy, sends one or more corresponding Ping commands to the managed device, wherein each Ping command sets the size of the ICMP payload in corresponding ICMP echo request packet to be equal to each detecting value minus 42 bytes.

The managed device responds to the network management server with one or more ICMP echo response packets, and the network management server determines the PMTU by determining whether each of these ICMP echo response packets is fragmented.

For example, the network management server sends the following eight Ping commands to the managed device:

Ping−1 (Length-42) 60.0.1.60;
Ping−1 (Length-41) 60.0.1.60;
Ping−1 (Length-40) 60.0.1.60;
Ping−1 (Length-39) 60.0.1.60;
Ping−1 (Length-38) 60.0.1.60:
Ping−1 (Length-37) 60.0.1.60;
Ping−1 (Length-36) 60.0.1.60;
Ping−1 (Length-35) 60.0.1.60;

Table 3 depicts fragment states of the ICMP echo response packets received by the network management server and the PMTU determined accordingly, Wherein, value “0” represents that the echo response packet is not a fragment packet, and value “1” represents that the echo response packet is a fragment packet.

TABLE 3

| PMTU | Length-42 | Length-41 | Length-40 | Length-39 | Length-38 | Length-37 | Length-36 | Length-35 |
|---|---|---|---|---|---|---|---|---|
| Length-14 | 0 | 1 | 1 | 1 | 1 | 1 | 1 | 1 |
| Length-13 | 0 | 0 | 1 | 1 | 1 | 1 | 1 | 1 |
| Length-12 | 0 | 0 | 0 | 1 | 1 | 1 | 1 | 1 |
| Length-11 | 0 | 0 | 0 | 0 | 1 | 1 | 1 | 1 |
| Length-10 | 0 | 0 | 0 | 0 | 0 | 1 | 1 | 1 |
| Length-9 | 0 | 0 | 0 | 0 | 0 | 0 | 1 | 1 |
| Length-8 | 0 | 0 | 0 | 0 | 0 | 0 | 0 | 1 |
| Length-7 | 0 | 0 | 0 | 0 | 0 | 0 | 0 | 0 |

In Table 3, the PMTU is equal to the maximum non-fragment response packet length minus 14 bytes of the layer-2 Ethernet header; or in other words, the PMTU is equal to the size of the ICMP data in the longest non-fragment response packet plus 28 bytes of the ICMP header and the IP header. The network management server can determine the PMTU by sending at most 8 Ping commands.

Figure 4:
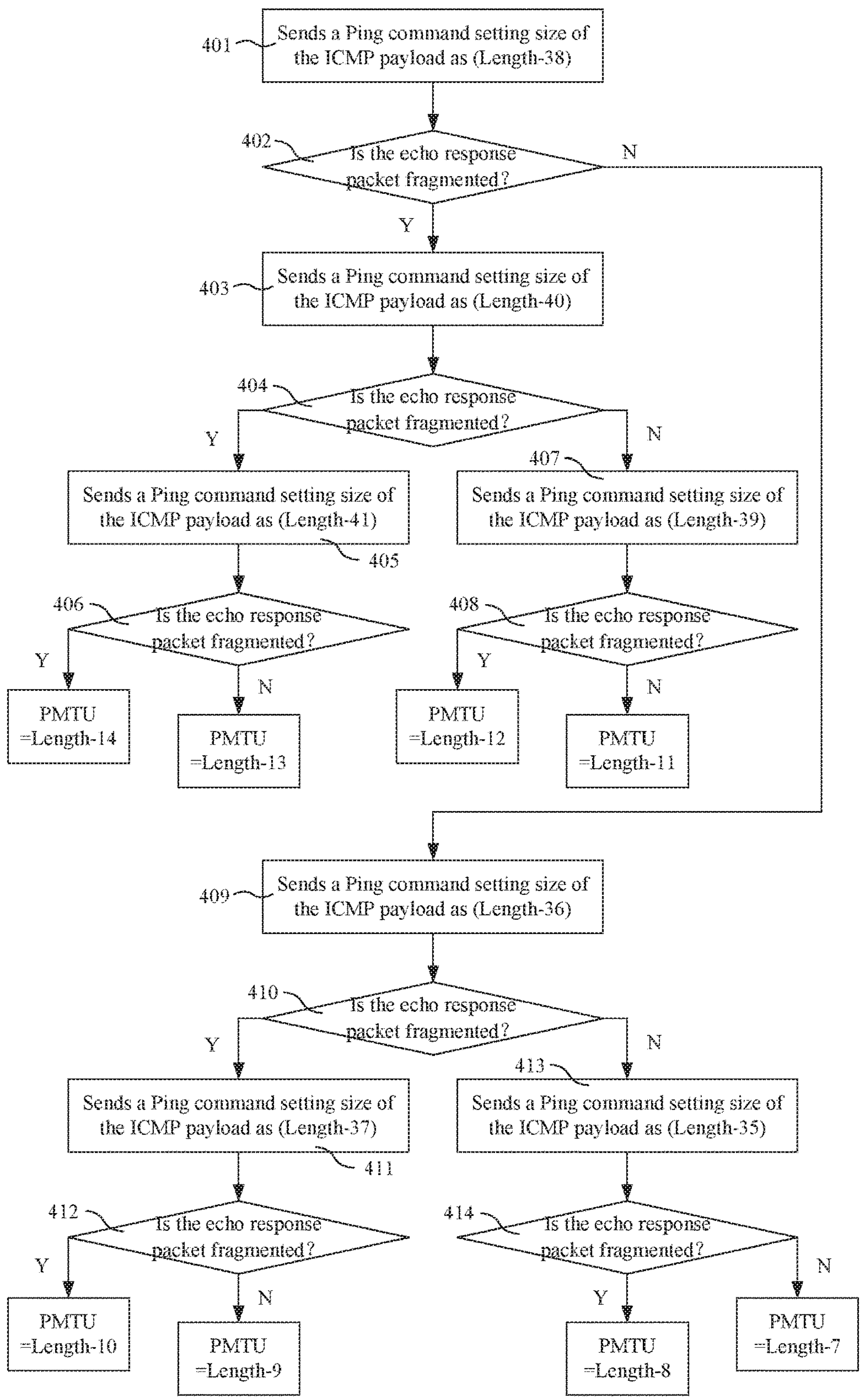
FIG. 4 is a flow chart of discovering a PMTU through binary search according to an example of the disclosure.

In another example, the network management server can discover the PMTU by selecting detecting values in the range of [Length, Length+7] through a binary search. The flow of this method may be as illustrated in FIG. 4.

At block 401, the network management server selects (Length+4) as a detecting value, and sends a Ping command of Ping−1 (Length-38) 60.0.1.60 to the managed device;

At block 402, the network management server determines whether the echo response packet of (Length+4) bytes is fragmented, and if so, the procedure proceeds to block 403; otherwise, the procedure jumps to block 409;

At block 403, the network management server selects (Length+2) in the range of [Length, Length+4] as a detecting value, and sends a Ping command of Ping−1 (Length-40) 60.0.1.60 to the managed device;

At block 404, the network management server determines whether the echo response packet of (Length+2) bytes is fragmented, and if so, the procedure proceeds to block 405; otherwise, the procedure jumps to block 407;

At block 405, the network management server selects (Length+1) in the range of [Length, Length+2] as a detecting value, and sends a Ping command of Ping−1 (Length-41) 60.0.1.60 to the managed device;

At block 406, the network management server determines whether the echo response packet of (Length+1) is fragmented, and if so, the PMTU is determined as equal to (Length-14) bytes; otherwise, the PMTU is determined as equal to (Length-13) bytes, and the procedure ends;

At block 407, the network management server selects (Length+3) in the range of [Length+2, Length+4] as a detecting value, and sends a Ping command of Ping−1 (Length-39) 60.0.1.60 to the managed device;

At block 408, the network management server determines whether the echo response packet of (Length+3) bytes is fragmented, and if so, the PMTU is determined as equal to (Length-12) bytes; otherwise, the PMTU is determined as equal to (Length-11) bytes, and the procedure ends;

At block 409, the network management server selects (Length+6) in the range of [Length+4, Length+7] as a detecting value, and sends a Ping command of Ping−1 (Length-36) 60.0.1.60 to the managed device;

At block 410, the network management server determines whether the echo response packet of (Length+6) bytes is fragmented, and if so, the procedure proceeds to block 411; otherwise, the procedure jumps to block 413;

At block 411, the network management server selects (Length+3) in the range of [Length+4, Length+6] as a detecting value, and sends a Ping command of Ping−1 (Length-37) 60.0.1.60 to the managed device;

At block 412, the network management server determines whether the echo response packet of (Length+5) bytes is fragmented, and if so, the PMTU is determined as equal to (Length-10) bytes; otherwise, the PMTU is determined as equal to (Length-9) bytes, and the procedure ends:

At block 413, the network management server selects (Length+7) in the range of [Length+6, Length+7] as a detecting value, and sends a Ping command of Ping−1 (Length-35) 60.0.1.60 to the managed device; and At block 414, the network management server determines whether the echo response packet of (Length+7) bytes is fragmented, and if so, the PMTU is determined as equal to (Length-8) bytes; otherwise, the PMTU is determined as equal to (Length-7) bytes, and the procedure ends.

According to the flow showed in FIG. 4, the network management server can determine the PMTU by sending at most three Ping commands.

In network management, it may be important for the network management server to timely sense whether the managed device operates normally. In a number of application scenarios, the network management server initiatively sends a periodic polling probe packet (e.g., a Ping command) to the managed device, and determines the state of the managed device according to whether a response from the managed device is received. The polling packet can be used as the packet for requesting the managed device to respond with a packet of some length, and thereby the PMTU can be discovered by transmitting conventional network management packets. In this way, an influence of discovering PMTU upon the occupancy of network resources and the performance of the network may be further lowered. Moreover, since a large amount of data in network management are transmitted along a path from the managed device to the network management server, discovering the PMTU of the path on the network management server may optimize the transmission of network management data.

In correspondence to the flow above, the present disclosure further provides a device for discovering a PMTU. The device may be provided in a destination node of a path and may include a processor to perform any of the above described methods. The device may implement the methods by software, hardware or a combination of hardware and software. For example, the device may include a processor to execute machine readable instructions or with internal circuitry configured to implement the method or a combination of both. Here the term processor is used generally and may refer to a single processor or a plurality of processors. If the device uses a software centered approach, then the processor may for example be a central processing unit or logic device to execute machine readable instructions stored on a non-transitory machine readable storage medium. If the device uses a hardware centered approach, then the processor may be a logic device such as an application specific integrated chip (ASIC), a field programmable gate array (FPGA), or a complex programmable logic device (CPLD). Further, the device may use a combination of hardware and software, for example both a CPU and a hardware logic chip. FIG. 1 shows an example in which the control logic of the device is schematically shown PMTU discovery control logic stored in the storage medium 112 and executable by a processor 111.

Figure 5:
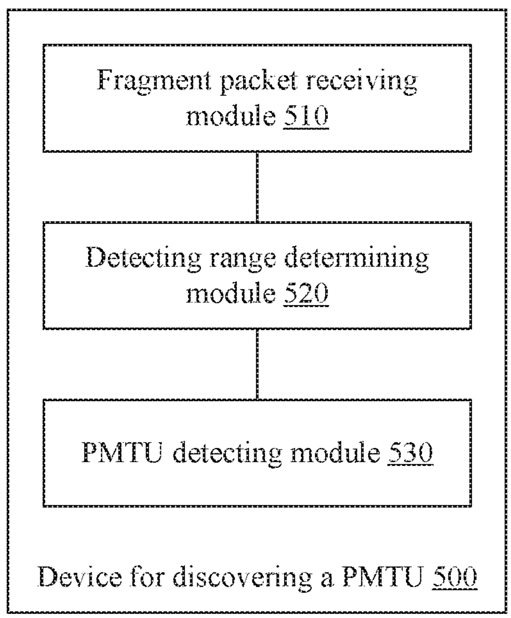
FIG. 5 is a logical structural diagram of a device for discovering a PMTU according to an example of the disclosure.

FIG. 5 illustrates a device 500 for discovering a PMTU according to an example of this disclosure. The device 500 may be located on a destination node of a path. And functionally, the device 500 may include a fragment packet receiving module 510, a detecting range determining module 520 and a PMTU detecting module 530, wherein:

The fragment packet receiving module 510 is to receive a fragment packet from a source node of the path;

The detecting range determining module 520 is to determine a detecting range according to the maximum length and the minimum fragment unit of the fragment packets; and The PMTU detecting module 530 is to select detecting values in the detecting range according to a predetermined strategy, request the source node to respond with a response packet of a length equal to each detecting value, and determine the PMTU of the path according to whether each response packet is fragmented.

The device 500 can further include a fragment packet requesting module to request the source node to respond with a packet of a specified length. In this case, the fragment packet from the source node of the path may be a fragment packet fragmented from the response packet of the specified length generated by the source node in response to the request.

A lower limit of the detecting range is the maximum length of the fragment packets; and an upper limit of the detecting range is the maximum length of the fragment packets plus the minimum fragment unit minus 1.

In an example, the PMTU detecting module 530 may include a sequential detecting submodule and a PMTU calculating submodule, wherein: the sequential detecting submodule is to select respective detecting values sequentially in the detecting range, and request the source node to respond with a packet of the length equal to each detecting value; and the PMTU calculating submodule is to calculate the PMTU of the path according to the length of the longest response packet which is not fragmented.

In another example, the PMTU detecting module 530 may include a binary detecting submodule and a PMTU calculating submodule, wherein: the binary detecting submodule is to select a detecting value in the detecting range through a binary search, request the source node to respond with a response packet of the length equal to the detecting value, and if the response packet is not fragmented, select a next detecting value in the larger half of the previous range; otherwise, select a next detecting value in the smaller half of the previous range until the longest response packet which is not fragmented is located; and the PMTU calculating submodule is to calculate the PMTU of the path according to the length of the longest response packet which is not fragmented.

The device 500 may further include a PMTU change detecting module and a rediscovering module, wherein: the PMTU change detecting module is to, if a preset condition is satisfied after the PMTU of the path is determined, request the source node to respond with a packet of a length corresponding to PMTU and a packet of a length corresponding to (PMTU+1); and the rediscovering module is to, if the packet of the length corresponding to PMTU is fragmented or the packet of the length corresponding to (PMTU+1) is not fragmented, rediscover the PMTU of the path by using the fragment packet receiving module 510, the detecting range determining module 520 and the PMTU detecting module 530.

In an example, the PMTU detecting module 530 may include a Ping command sending submodule to send a Packet Internet Groper (Ping) command to the source node of the path, wherein: the size of Internet control message protocol (ICMP) data set in the Ping command corresponds to the detecting value; and the minimum fragment unit is the minimum fragment unit according to the IP protocol.

The above described modules may be implemented by software, hardware or a combination of software and hardware as described above. For example the modules may be implemented by a processor executing machine readable instructions or a logic device such as an ASIC. FPGA or CPLD or a combination of a processor executing machine readable instructions and a logic device.

The foregoing disclosure is merely illustrative of preferred embodiments of the disclosure but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for discovering a Path Maximum Transmission Unit (PMTU), is applied to a destination node of a path and comprises:

receiving fragment packets from a source node of the path;

determining a detecting range based on a maximum length and a minimum fragment unit of the received fragment packets by:

setting the maximum length of the received fragment packets as a lower limit of the detecting range; and setting the maximum length plus the minimum fragment unit minus 1 (the maximum length+the minimum fragment unit−1) as an upper limit of the detecting range; and selecting detecting values within the detecting range in accordance with a predetermined strategy, requesting the source node to respond with a response packet of a length equal to each detecting value, and determining a PMTU of the path based on whether each response packet from the source node is fragmented.

2. The method according to claim 1, before receiving fragment packets from the source node, further comprises:

requesting the source node to respond with a packet of a specified length, wherein, the fragment packets from the source node of the path include fragment packets fragmented from a packet of the specified length which is generated by the source node in response to the request.

3. The method according to claim 1, wherein, selecting detecting values within the detecting range in accordance with the predetermined strategy, requesting the source node to respond with a response packet of the length equal to each detecting value, and determining the PMTU of the path based on whether each response packet from the source node is fragmented comprises:

selecting detecting values sequentially in the detecting range, and requesting the source node to respond with a response packet of the length equal to each detecting value; and calculating the PMTU of the path according to the length of the longest response packet from the source node which is not fragmented, in such a way that the PMTU is equal to the length of the layer-2 payload in the longest response packet from the source node which is not fragmented.

4. The method according to claim 1, wherein, selecting detecting values within the detecting range in accordance with the predetermined strategy, requesting the source node to respond with a response packet of the length equal to each detecting value, and determining the PMTU of the path based on whether each response packet from the source node is fragmented comprises:

selecting a detecting value in the detecting range through a binary search, and requesting the source node to respond with a response packet of the length equal to the detecting value; if the response packet from the source node is not fragmented, selecting a next detecting value in the larger half of the previous range, otherwise selecting a next detecting value in the smaller half of the previous range, until the longest response packet from the source node which is not fragmented is located; and calculating the PMTU of the path according to the length of the longest response packet from the source node which is not fragmented, in such a way that the PMTU is equal to the length of the layer-2 payload in the longest response packet from the source node which is not fragmented.

5. The method according to claim 1, after the PMTU of the path is determined, further comprises:

requesting the source node to respond with a response packet of a length corresponding to the determined PMTU and a response packet of a length corresponding to the determined PMTU plus 1 (PMTU+1), if a preset condition is satisfied; and rediscovering the PMTU of the path if the response packet of the length corresponding to the determined PMTU is fragmented, or the response packet of the length corresponding to the determined PMTU plus 1 is not fragmented.

6. The method according to claim 1, wherein, requesting the source node to respond with a response packet of the length equal to each detecting value comprises: sending a Packet Internet Groper (Ping) command to the source node of the path, wherein:

the size of the Internet control message protocol (ICMP) data in the response packet set in the Ping command is equal to the detecting value minus 42 bytes; and the minimum fragment unit is the minimum fragment unit according to the IP protocol.

7. A device for discovering a Path Maximum Transmission Unit (PMTU), comprising a processor and a non-transitory storage medium storing machine readable instructions which are to act as control logic for discovering a PMTU, the machine readable instructions being executable by the processor to:

receive fragment packets from a source node of a path;

set a maximum length of the received fragment packets as a lower limit of a detecting range;

set a maximum length of the received fragment packets plus a minimum fragment unit minus 1 (the maximum length+the minimum fragment unit−1) as an upper limit of the detecting range;

determine the detecting range based on the maximum length and the minimum fragment unit of the received fragment packets; and select detecting values within the detecting range in accordance with a predetermined strategy, request the source node to respond with a response packet of a length equal to each detecting value, and determine a PMTU of the path based on whether each response packet from the source node is fragmented.

8. The device according to claim 7, wherein, the instructions further cause the processor to:

before receiving fragment packets from the source node, request the source node to respond with a packet of a specified length, wherein, the fragment packets from the source node of the path include fragment packets fragmented from a packet of the specified length which is generated by the source node in response to the request.

9. The device according to claim 7, wherein, the instructions further cause the processor to:

select detecting values sequentially in the detecting range, and request the source node to respond with a response packet of the length equal to each detecting value; and calculate the PMTU of the path according to the length of the longest response packet from the source node which is not fragmented, in such a way that the PMTU is equal to the length of the layer-2 payload in the longest response packet from the source node which is not fragmented.

10. The device according to claim 7, wherein, the instructions further cause the processor to:

select a detecting value in the detecting range through a binary search, and request the source node to respond with a response packet of the length equal to the detecting value; if the response packet from the source node is not fragmented, select a next detecting value in the larger half of the previous range, otherwise select a next detecting value in the smaller half of the previous range, until the longest response packet from the source node which is not fragmented is located; and calculate the PMTU of the path according to the length of the longest response packet from the source node which is not fragmented, in such a way that the PMTU is equal to the length of the layer-2 payload in the longest response packet from the source node which is not fragmented.

11. The device according to claim 7, wherein, the instructions further cause the processor to:

after the PMTU of the path is determined, request the source node to respond with a response packet of a length corresponding to the PMTU and a response packet of a length corresponding to the PMTU plus 1 (PMTU+1), if a preset condition is satisfied; and rediscover the PMTU of the path if the response packet of the length corresponding to the determined PMTU is fragmented, or the response packet of the length corresponding to the determined PMTU plus 1 is not fragmented.

12. The device according to claim 7, wherein the instructions further cause the processor to:

send a Packet Internet Groper (Ping) command to the source node, wherein: the size of the Internet control message protocol (ICMP) data in the response packet set in the Ping command is equal to the detecting value minus 42 bytes; and the minimum fragment unit is the minimum fragment unit according to the IP protocol.

13. A device for discovering a Path Maximum Transmission Unit (PMTU), comprising:

a fragment packet receiving module to receive fragment packets from a source node of a path when the device is located on a destination node of the path;

a detecting range determining module to determine a detecting range based on a maximum length and a minimum fragment unit of the received fragment packets by:

setting the maximum length of the received fragment packets as a lower limit of the detecting range; and setting the maximum length plus the minimum fragment unit minus 1 (the maximum length+the minimum fragment unit−1) as an upper limit of the detecting range; and a PMTU detecting module to select detecting values within the detecting range in accordance with a predetermined strategy, requesting the source node to respond with a response packet of a length equal to each detecting value, and determining a PMTU of the path based on whether each response packet from the source node is fragmented.

* * * * *